(No Model.)
F. C. ROMKEY.
HARROW.
No. 286,154. Patented Oct. 2, 1883.
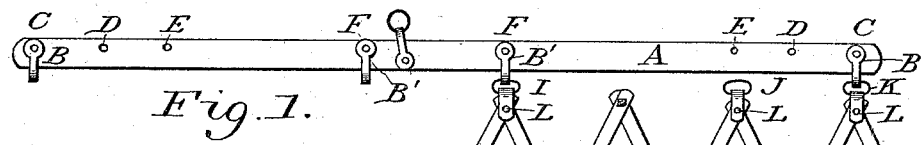
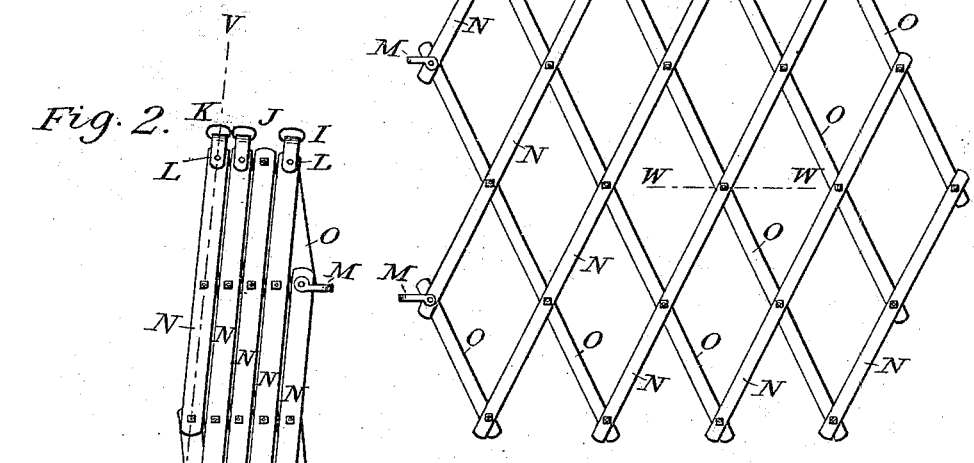
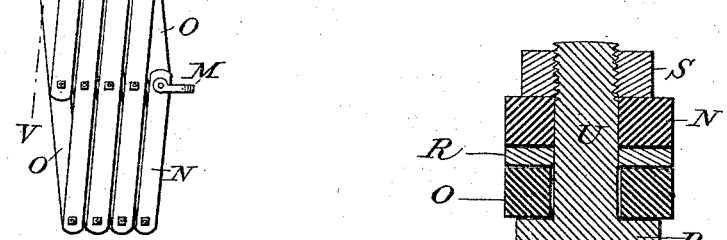
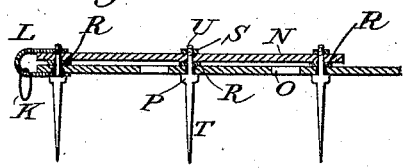
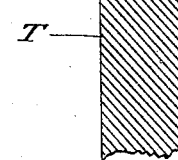
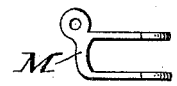
Witnesses:
H. W. Schwamm
N. S. Hammock
Inventor:
Frank C. Romkey

UNITED STATES PATENT OFFICE.

FRANK C. ROMKEY, OF BURLINGTON, IOWA.

HARROW.

SPECIFICATION forming part of Letters Patent No. 286,154, dated October 2, 1883.

Application filed August 22, 1881. (No model.)

*To all whom it may concern:*

Be it known that I, FRANK C. ROMKEY, a citizen of the United States, residing at Burlington, in the county of Des Moines and State of Iowa, have invented a new and useful Improvement in Harrows, of which the following is a specification.

My invention relates to improvements in harrows; and it consists in a peculiar hinge, a loosely-pivoted frame, and adjustable connections, whereby a flexible and easily extended or folded device is produced.

In the accompanying drawings, Figure 1 is a top view of the right section of a harrow constructed on my plan. A top view of the draft-bar A is also shown. Fig. 2 is a top view of a left section of my harrow pressed or folded together until the edges of the bars come in contact with each other. Fig. 3 is a sectional side view taken through the line V V of Fig. 2. Fig. 4 represents a sectional view taken through the line W W in Fig. 1. Fig. 5 is a side view of the clevis-shaped hinge M.

Similar letters refer to similar parts throughout the several views.

This harrow is designed to be made in two sections, both exactly alike, with the exception of one being for the left (see Fig. 2) and the other for the right (see Fig. 1) side. Both sections are to be used at the same time, but each can be used separately, if desired. The sections can be made any width desired, and three or more can be used at once by using a longer draw-bar. Each section is formed of six parallel bars, N, and six parallel bars, O, which cross each other diagonally and at acute angles with the draw-bar A, and are securely pivoted together at the point of crossing by the shanks U of the teeth, which pass through round holes formed in the bars N and O for that purpose. The teeth T have round shanks formed or forged upon their upper ends. These shanks have an equal thickness their entire length, and have screw-threads cut upon their upper ends to receive the nuts S. A shoulder, P, is formed or forged upon the teeth just beneath the shank. This shoulder serves as a turn-table for the bars O, upon which the said bars rest. The holes formed in the bars O, through which the shanks of the teeth pass, are one-fortieth of an inch greater in diameter than the diameter of the shank U. This allows the bars O to move without friction upon the shank U. This is plainly shown in Fig. 4. The holes formed in the bars N are of such a diameter that the shanks can be driven therein tight. By this arrangement I have all the teeth to remain stationary with the upper bars, N. This prevents the working loose of the nuts S from the movements or vibrations of the bars N O, in extending or narrowing the frame, or in using in the field. A circular plate, R, formed of suitable material, and whose diameter should not exceed the width of the bars N O, between which it is used, and whose thickness should be about one-sixteenth of an inch, is placed between the bars N and O at each crossing or intersection of said bars, and are held in place by the shanks of the teeth passing through a hole formed in the center of said plate, (see Fig. 4,) for the purpose of raising the bars N above the bars O, (see Fig. 3,) in order that the bars may pass clear of each other to avoid the friction between the upper and lower bars in folding together or drawing apart; also to serve as a turn-table or friction-plate, in order that the friction between the bars N O may be reduced to as small a space as possible, thus enabling a person to clamp the bars N O firmly between the shoulders P and the nuts S. This arrangement allows the frame to be folded together and drawn apart with ease without loosening the nuts S. It will be observed that were the bars N placed direct upon the bars O, and then clamped firmly between the shoulders P and nuts S, the friction between the upper and lower bars would be so great that the frame of the harrow could not be moved or folded together, nor drawn apart, unless the nuts S were first loosened. The manner in which the bars N and O are arranged admits of their being moved in relation to each other in such a manner as to widen or lengthen the sections formed by them, and thereby vary the distance between the teeth of each section. In order to retain the required width of the section, they are each provided with three small clevises, L, (shown in Fig. 1,) placed upon the points formed by the bars N O, as shown in Fig. 1, and secured to the frame by the shanks U of the teeth T. (See Fig. 3.) Each of the clevises L contains a ring, I J K. The draw-bar A has a number of holes formed or bored in it at convenient distances apart to receive the bolts or pins of the clevises B B', which are fastened or attached to the rings I and K. In narrowing the frame the sections are pressed together until the ring K and clevis B correspond with the holes D and E in the draw-bar A. In extending or widening the frame, the clevis B is attached to the ring J, and the sections are drawn apart until the ring J corresponds with the holes D and E of the draw-bar A. I apply the draft a short distance from the center of the draw-bar A, (commonly known as a side hitch.) This causes the harrow to be drawn at such an angle that no two teeth will be drawn in the same path. The two sections are fastened or attached to each other by clevis-shaped hinges M, which are pivoted to the frame by the shank U of the teeth T passing through holes formed in the hinges and bars for that purpose. This allows the hinges to turn, and one section can be folded while the other remains spread. This could not be done if the hinges were not pivoted, as the distance between the hinges of one section when folded is greater than the distance between the hinges of the section that remains spread. By folding one section at a time the hinges will turn to suit the width of the folded section. The form of the hinges, and the mode of securing them to the frame, allows either section to play forward or backward, or to give the sections a vibrating motion.

What I desire to claim is—

1. The clevis-shaped hinge M, in combination with the harrow-frame loosely pivoted together by the harrow-teeth, substantially as and for the purposes set forth.

2. In combination with the clevis-shaped hinges M and harrow-frame loosely connected together by the harrow-teeth, the perforated draft-bar A, adjustably connected to the harrow-frame, as described, by the flexible clevis and ring connections, as set forth.

3. The harrow-frame consisting of the bars N and O, loosely pivoted together by means of the teeth T and nut, and provided with the friction-plates R, in combination with the clevis-shaped hinge M and draft-bar A, substantially as described.

FRANK C. ROMKEY.

Witnesses:
J. SCHWALLER,
J. H. ROMKEY.